United States Patent
Bouvet et al.

(10) Patent No.: US 10,554,481 B2
(45) Date of Patent: Feb. 4, 2020

(54) METHOD, DEVICE AND SYSTEM FOR DETECTING A QUALITY OF SERVICE PROBLEM

(71) Applicant: Orange, Paris (FR)

(72) Inventors: Bertrand Bouvet, Perros-Guirec (FR); Francois Toutain, Louannec (FR); Catherine Salou, Lannion (FR); Mathilde Cosquer, Caouennec-Lanvezeac (FR)

(73) Assignee: ORANGE, Paris (FR)

( * ) Notice: Subject to any disclaimer, the term of this patent is extended or adjusted under 35 U.S.C. 154(b) by 902 days.

(21) Appl. No.: 14/257,634

(22) Filed: Apr. 21, 2014

(65) Prior Publication Data

US 2014/0317262 A1    Oct. 23, 2014

(30) Foreign Application Priority Data

Apr. 19, 2013  (FR) ...................................... 13 53564

(51) Int. Cl.
| | |
|---|---|
| *G06F 15/16* | (2006.01) |
| *H04L 12/24* | (2006.01) |
| *H04L 29/06* | (2006.01) |

(52) U.S. Cl.
CPC .............. *H04L 41/08* (2013.01); *H04L 65/60* (2013.01)

(58) Field of Classification Search
CPC . H04L 41/08; H04L 65/1006; H04L 65/1016; H04L 65/60; H04L 65/103; H04L 65/80

(Continued)

(56) References Cited

U.S. PATENT DOCUMENTS

| | | | |
|---|---|---|---|
| 2008/0291930 A1 | 11/2008 | Damola et al. | |
| 2009/0185492 A1* | 7/2009 | Senarath | H04B 7/155 370/238 |

(Continued)

FOREIGN PATENT DOCUMENTS

EP    2264959 A1    12/2010

OTHER PUBLICATIONS

French Search Report and Written Opinion dated Jan. 17, 2014 for corresponding French Application No. 1353564, filed Apr. 19, 2013.

(Continued)

*Primary Examiner* — Normin Abedin
(74) *Attorney, Agent, or Firm* — David D. Brush; Westman, Champlin & Koehler, P.A.

(57) ABSTRACT

A method for locating a quality of service problem implemented on a terminal during a multi-media session between two terminals over a communication network, which includes at least one media gateway that is able to retransmit media data packets without particular processing according to a "router mode" of management. The terminals obtain a first quality of service data item relating to the multi-media session. Following a change in the mode of management to a "relay mode" in which the multi-media session initially established between the terminals is split into two separate multi-media sessions, it includes: obtaining of a second quality of service data item relating to one of the two multi-media sessions established following the change in the mode of management of the media gateway; comparing the first and second quality of service data items; and locating the quality of service problem depending on the result of the comparison.

15 Claims, 4 Drawing Sheets

(58) Field of Classification Search
USPC .......................................................... 709/224
See application file for complete search history.

(56) References Cited

U.S. PATENT DOCUMENTS

| 2010/0189097 | A1* | 7/2010 | Weissmann | H04L 65/1069 |
| | | | | 370/352 |
| 2014/0075038 | A1* | 3/2014 | Kato | H04L 65/1043 |
| | | | | 709/228 |
| 2015/0341466 | A1* | 11/2015 | Sah | G06F 17/30545 |
| | | | | 707/770 |

OTHER PUBLICATIONS

English translation of the French Written Opinion dated Jan. 17, 2014 for corresponding French Application No. 1353564, filed Apr. 19, 2013.

* cited by examiner

METHOD, DEVICE AND SYSTEM FOR DETECTING A QUALITY OF SERVICE PROBLEM

FIELD OF THE DISCLOSURE

The present invention relates to the field of telecommunications, and more precisely to systems for monitoring quality of service during multi-media transmissions on IP (Internet Protocol) networks.

BACKGROUND OF THE DISCLOSURE

The perceived quality during a multi-media communication on an IP network depends on a certain number of factors, such as for example the available bandwidth, the processing power of the terminals or else the quality of the wireless transmissions implemented. In addition, the transmission quality in the course of a multi-media communication is not always symmetrical and, because of this, participants in one and the same multi-media communication can encounter different inconveniences in the event of poor transmission quality.

Certain communication applications can nonetheless supply information on the quality of service, or QoS. This information is often depicted on the terminal by a pictogram associated with a color code (for example red, orange or green) or else by a histogram reflecting the quality of the transmission.

Real-time IP communication applications using the RTP (Real-Time Transport Protocol) protocol to transmit and receive media streams (audio, video etc.) and its complementary RTCP (Real-Time Transport Control Protocol) protocol as described in IETF standard RFC3550 to transmit and receive quality of service information (number of IP packets lost, delay, jitter etc.) can in particular give users an indication of the quality of the transmission. Unfortunately this information is not very useful when it comes to diagnosing the cause of the problem, since it is a question of an item of information measured from end to end, from terminal to terminal. When the quality is detected as being poor at the level of the multi-media communication, this only confirms what the users have observed (pixellated or jerky video, degraded sound etc.) and does not contribute any information as to the location of the problem. Now, if the user had access to information allowing him to identify the location of the problem, he could attempt to remedy it (for example by coming closer to his WiFi access point or by freeing up memory on his terminal).

A need therefore exists for the user to be able to locate the origin of a communication quality problem. This need should be on the increase inasmuch as the terminals of users are more and more connected using various access networks (Edge, 3G, 4G, home WiFi, community WiFi etc.), the latter offering very variable and fluctuating bandwidths and QoS.

SUMMARY

An exemplary embodiment aspect of the present disclosure relates to a method for locating a quality of service problem implemented on a terminal during a multi-media session established between two terminals over one or more communication networks comprising at least one media gateway that is able to retransmit the media data packets without particular processing according to a first mode of management called "router mode", the terminals obtaining a first quality of service data item relating to the multi-media session. The method is such that, following a change in the mode of management of the multi-media session by the media gateway to a mode of management called "relay mode" in which the multi-media session initially established between the terminals is split into two separate multi-media sessions, it includes the following steps:

obtaining of a second quality of service data item relating to one of the two multi-media sessions established following the change in the mode of management of the media gateway;

comparison of the first and second quality of service data items;

location of the quality of service problem depending on the result of the comparison.

The second quality of service provides information on the quality over a session that is no longer from end to end. The user of one of the terminals can then locate a quality of service problem by means of comparison with the first item of quality information relating to the end-to-end multi-media session. He can thus adapt his behavior where applicable.

In this description and also in the claims, the terms "terminal" and "terminals" are intended to be understood in the broad sense and can denote network appliances situated at either end of a communication link. An embodiment is therefore applicable in the case of a communication between two terminals, between an appliance and a terminal or between two appliances. For example, and not exhaustively, an embodiment can apply to a communication between two telephony or videotelephony terminals, between a telephony terminal and a mail server, or else between a terminal of PC or connected television type and a video streaming server.

The various embodiments and embodiment features mentioned hereinafter may be added, independently or in combination with one other, to the steps of the method defined above.

According to a particular embodiment, the location method includes a step of sending a request to change the mode of management to the media gateway preceding the step of obtaining the second quality of service data item.

In this way, the terminal can, on its own initiative, provoke a change in the operating mode of the media gateway and thus obtain a second quality of service data item enabling it to locate the QoS problem.

According to another particular embodiment, the sending of the request to change the mode of management is triggered following the detection of a quality of service problem by comparing the first quality of service data item with a predetermined threshold.

The location of the QoS problem can thus be triggered automatically, without action by the user, when disturbances impair the quality of the communication.

According to another embodiment, the sending of the request to change the mode of management is triggered following an action of the user on an interface of the first or second terminal.

Thus, when the user observes a quality problem impairing a communication, he can explicitly command the location of the problem via the interface of his terminal.

According to another particular embodiment, the request to change the mode of management of the multi-media session is an SIP renegotiation message of RE-INVITE or UPDATE+PRACK type comprising an SDP component enriched with a new parameter that is able to make said media gateway switch to the "relay" mode of management.

The method is thus compatible with a network core of IMS (IP Multi-media Subsystem) type and does not require the definition of a dedicated type of signaling message that could cause a defect in an appliance that might not implement an embodiment of the invention.

According to another embodiment, the location method includes a step of receiving a notification of the change in the mode of management of the media gateway.

Thus, a terminal that receives this notification can indicate to its user that his correspondent or an appliance of the network has requested the location of a QoS problem and the terminal can interpret the new quality of service data item received so as to display a diagnosis.

According to another particular embodiment, the notification of the change in the mode of management of the multi-media session is an SIP renegotiation message of RE-INVITE or UPDATE+PRACK type comprising an SDP component enriched with a new parameter that is able to trigger the comparison and location steps.

The method is thus compatible with a network core of IMS (IP Multi-media Subsystem) type and does not require the definition of a dedicated type of signaling message that could cause a defect in an appliance that might not implement an embodiment the invention.

According to another particular embodiment, the first quality of service data item is obtained from the data packets received on the basis of the RTCP protocol and/or from the analysis of the packets received on the basis of the RTP protocol.

In this manner, the method can rely on existing and widely deployed protocols to obtain the quality of service data item, thus facilitating the incorporation of an embodiment the invention into existing communication networks.

According to another embodiment, the location method includes a step of obtaining parameters that are liable to influence the QoS on the terminal and a step of suggesting possible actions to improve the quality of service depending on the parameters obtained.

The user can thus perform the actions indicated in the aim of improving the quality of the communication. The collected parameters can for example be the strength of the WiFi signal, the usage rate of the processor, of the memory or of the network connection, or any other parameter liable to influence the QoS. In the case where the location method has established that the QoS problem was situated with one user, the method according to an embodiment will be able, for example, to display suggestions on the screen of the terminal and for example to suggest to the user to come closer to his WiFi access point, to stop other applications on his terminal in order to free up resources or to take any other action likely to improve the QoS on the communication depending on the parameters collected on the terminal.

According to another particular embodiment, the location method includes, following the location step, a step of sending to the media gateway a command to change the mode of management of the multi-media session to the mode of management called "router mode".

The method thus allows a return to the initial operating mode following the location of the problem and thus makes it possible to relieve the media gateway of additional processing occasioned by the activation of the "relay" mode.

An embodiment also relates to a method for aiding the diagnosis of a quality of service problem implemented by a media gateway during a multi-media session established between two terminals, the media gateway being able to retransmit the data packets without particular processing according to a first mode of management called "router mode", the method being characterized in that it includes the following steps:

obtaining of a request to change the mode of management of the multi-media session. Optionally, the obtaining of the request can be done following a step of reception, by a media appliance, of a first QoS data item computed and transmitted by the terminals;

activation of a second mode of management called "relay mode" in which the multi-media session initially established between the two terminals is split into two separate sessions, a first session established between a first terminal and the media gateway, a second session established between the media gateway and a second terminal, the media gateway providing two-way relaying of the media data packets received from one session to the other session;

computation of the quality of service data item relating to the first session established between the first terminal and the gateway and computation of the quality of service data item relating to the second session established between the gateway and the second terminal;

transmission of the quality of service data item relating to the first session to the first terminal and computation and transmission of the quality of service data item relating to the second session to the second terminal;

changing of the mode of management of the session to the "router" mode.

The activation of the "relay" mode of management on the media gateway enables the division of the session initially established from end to end into two independent sections. This division into two sessions allows the terminals to locate the origin of a QoS problem by dichotomy.

According to a particular embodiment of the diagnosis aid method, the request to change the mode of management is obtained following the reception by the media gateway of a command transmitted by an appliance that is able to interpret the signaling protocol implemented to establish the multi-media session.

In this manner, the change in operating mode can be carried out on the initiative of a network appliance that is able to manage the communications and services of the user, such as an AS (Application Server) or a P-CSCF (Proxy-Call State Control Function) in the case of an IMS network.

According to a particular embodiment of the diagnosis aid method, the request to change the mode of management is obtained following the detection by a media appliance of a quality of service problem by comparing a quality of service data item relating to the session established in "router mode" with a predetermined threshold.

The media gateway is thus itself able to trigger the diagnosis phase enabling the terminals to locate a QoS problem according to the location method. Furthermore, in the case where the terminals do not implement the location method, the media gateway or an appliance controlling it or linked to it can for example provoke the sending of a notification to the implicated terminal, for example by SMS (Short Message System) or by any other notification system.

An embodiment also relates to a device for locating a quality of service problem during a multi-media session established between two devices over one or more communication networks comprising at least one media gateway that is able to retransmit the media data packets without particular processing according to a first mode of management called "router mode", the devices obtaining a first quality of service data item relating to the multi-media session, the device being characterized in that it includes:

a module (103) for obtaining a second quality of service data item relating to one of the two multi-media sessions established following the change in the mode of management of the media gateway;

a module (107) for comparing the first and second quality of service data items;

a module (108) for locating the quality of service problem depending on the result of the comparison;

these modules being implemented following a change in the mode of management of the multi-media session by the media gateway to a mode of management called "relay mode" in which the multi-media session initially established between the devices is split into two separate multi-media sessions.

An embodiment also relates to a communication terminal comprising a location device as described above.

An embodiment also relates to a device for aiding the diagnosis of a quality of service problem during a multi-media session established between two terminals, the device being able to retransmit the data packets without particular processing according to a first mode of management called "router mode", the device being characterized in that it comprises:

a module for obtaining a request to change the mode of management of the multi-media session;

a module for activating a second mode of management called "relay mode" in which the multi-media session initially established between the two terminals is split into two separate sessions, a first session established between a first terminal and the device, a second session established between the device and a second terminal, the device providing two-way relaying of the media data packets received from one session to the other session;

a module for computing the quality of service data item relating to the first session and computing the quality of service data item relating to the second session;

a module for transmitting the quality of service data item relating to the first session to the first terminal and transmitting the quality of service data item relating to the second session to the second terminal. This module may also be able to receive the QoS data items computed and transmitted by the first and second terminals;

a module for changing the mode of management of the session to the "router" mode.

An embodiment also relates to a network appliance comprising a diagnosis aid device as described above.

An embodiment also relates to a system for locating a QoS problem comprising at least one location device in accordance with the above description and at least one diagnosis aid device in accordance with the above description.

An embodiment also relates to a computer program including instructions for the execution of the location method as described above and/or of the diagnosis aid method as described above when the program is executed by a processor.

The terminals, appliances, devices and programs have advantages analogous to those of the corresponding methods described above.

BRIEF DESCRIPTION OF THE DRAWINGS

Other advantages and features of the invention will appear more clearly upon reading the following description of a particular embodiment of the invention, given by way of illustrative and non-limiting example, and the appended drawings, among which.

DETAILED DESCRIPTION OF ILLUSTRATIVE EMBODIMENTS

Figure 1:
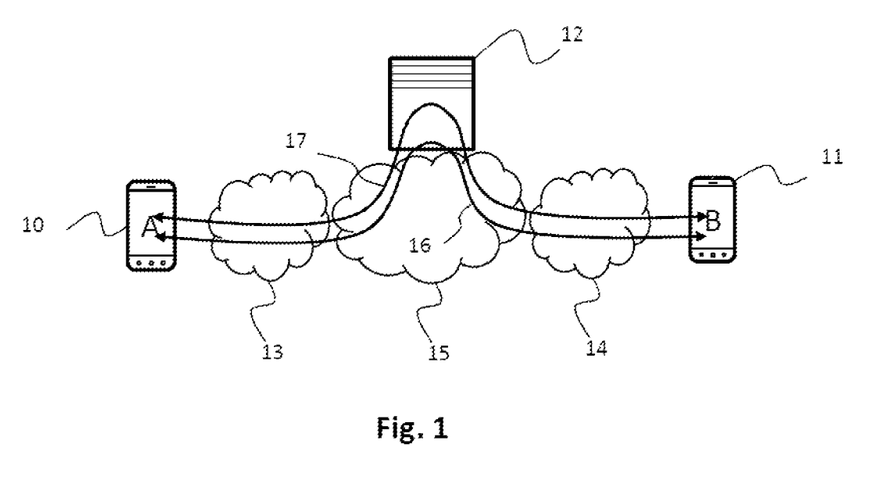
FIG. 1 illustrates an example of an environment for implementing the method according to an embodiment of the invention.

FIG. 1 illustrates an example of an environment for the implementation of the location method and the diagnosis aid method according to a particular embodiment of the invention. In this example, the environment comprises a first terminal (10) connected to an IP network core (15), which may be a network of IMS (IP Multi-media Subsystem) type, by way of an access network (13), which may for example be an ADSL (Asymmetric Digital Subscriber Line), fiber optic, cable or else 3G network. The environment comprises a second terminal (11) connected to the IP network core (15) by way of another access network (14), which may be, for example and not exhaustively, an ADSL, fiber optic or cable network or else a 3G network. The terminals can be connected to their access network by way of an access point, not shown in the figure. This access point may for example be a WiFi access point. In this example of implementation of the method, the IP network core (15) contains a media gateway (12) through which transit the media data streams (16) and the quality of service information (17) relating to a communication established between the terminals.

Let us take for example a user A of the first terminal (10) in multi-media communication with a user B of the second terminal (11). The multi-media communication may be a simple audio communication or an audio and video communication or else any other communication implementing at least one medium.

The communication can be disturbed for various reasons, such as for example a lack of resources on a terminal, which might prevent it from correctly encoding and/or decoding the multi-media stream, this lack of resources possibly being caused by other applications operating in parallel on the terminal. The disturbances may also be linked to the local access network or to the remote access network, which can lack bandwidth, be of poor quality or else be under-dimensioned (for example a crowded radio cell). In the case of a wireless access network, the signal quality likewise directly influences the quality of the communication. It is, however, possible to note that the IP network cores are generally not implicated when there is a problem since they are often over-dimensioned.

The disturbances then manifest themselves, from a technical point of view, as lost, impaired or out-of-sequence packets of communication data or else as an increased routing time. From the point of view of the user, these disturbances can translate into interruptions or even scrambling of the signal that can render a conversation unintelligible.

The location method and the diagnosis aid method implemented in the terminal (10) and the media gateway (12), respectively, make it possible to split the multi-media session into at least two sections and thereby to obtain quality of service measurements section by section, for example between the terminal A (10) and the media gateway then between the media gateway and the terminal B (11), so as to obtain information relating to the location of the disturbances. The invention makes it possible to take the measurements section by section without impact on the quality of the communication perceived by the user.

Figure 2A:
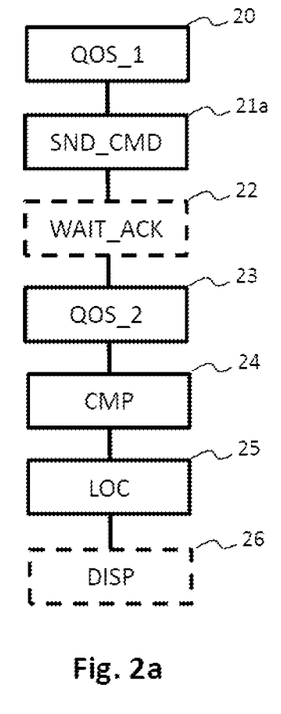
FIG. 2a illustrates the steps of the method for locating a quality of service problem implemented by a terminal in a first embodiment.

FIG. 2a illustrates a particular embodiment of the location method implemented for example by the terminal 10 in FIG. 1. The method can also be implemented by an appliance or network node.

In a step 20, a first quality of service data item is obtained. For example, the communication data can be transmitted using the RTP protocol. The quality of service data item will then be able to be obtained using the complementary RTCP protocol and from the packets of communication data received by the terminal 10 and sent by the terminal 11 with which the communication is established.

In a step 21a, optionally, the terminal 10 emits a command that is able to trigger, on the media gateway, a change in the mode of management of the multi-media session to a mode of management called "relay mode". The sending of this command can advantageously be carried out automatically, following the comparison of the first quality of service data item obtained during step 20 with one more predetermined thresholds: when the predefined threshold(s) is/are exceeded, for example after detection of an IP packet loss rate >3% and/or an end-to-end delay >500 ms and/or a jitter >200 ms or else other parameters representing the quality of service, the emission of the command can then be triggered. The sending of the command can also be provoked by an action of the user A on the graphical interface of the terminal 10. This last possibility has the advantage of allowing a user to trigger a change in the mode of management of the session by the media gateway himself if he deems that the quality of the communication is unsatisfactory.

In the case of a communication established following the SIP protocol, the command emitted by the terminal in step 21a can, for example, be an SIP renegotiation message of RE-INVITE or UPDATE+PRACK type comprising an SDP (Session Description Protocol) component enriched with a new parameter, for example, the attribute a=sendrecv being able to take the value a=sendrecv;b2b. Generally, any message that is able to provoke a renegotiation of the media data streams can be used to transmit the command.

According to a step 22, optionally, the terminal 10 awaits the confirmation of the change in the mode of management of the session on the media gateway. In the case where the communication would be established on the basis of the SIP protocol, the change in the mode of management of the session will advantageously be able to be indicated by a new item of information added to the reply or the acknowledgement of the renegotiation message, such as for example the attribute a=sendrecv;b2b as described in step 21a. The change in the mode of management of the session can equally be indicated in the band, i.e. in the communication data packet stream. For example, if the communication data items are transmitted by the RTP protocol, the terminal 10 can interpret a change in the value of the SSRC (Synchronization SouRCe) field of the header of the RTP packet as being a signal to change the mode of management of the session on the media gateway. This change of mode can also be signaled using for example the protocol described in IETF standard RFC 4733 or else by other signaling means.

In step 23, following the change in the mode of management of the session on the media gateway, a second quality of service data item is obtained, for example from the RTCP protocol and from the packets of communication data received by the terminal. This second quality of service data item then relates to the first section of the communication, established between the terminal 10 of the user A and the multi-media gateway 12.

The terminal 10 can then, following a step 24, carry out a comparison between the first quality of service data item, relating to the multi-media session established from end to end between the terminal 10 and the terminal 11, and the second quality of service data item, relating to the multi-media session established between the terminal 10 and the media gateway 12.

If the first quality of service data item indicates disturbances and the second quality of service data item also mentions these disturbances, the terminal 10 can thus deduce in a step 25 that the section situated between the terminal 10 and the multi-media gateway is responsible for at least some of the disturbances. On the other hand, if the second quality of service data item indicates a correct communication, then the disturbances take place on the section situated between the media gateway 12 and the terminal 11.

Thus, the terminal 10 has an item of information locating the disturbances encountered during the communication.

In a step 26, optionally, the terminal 10 can for example display a simplified representation of the end-to-end network and of the place giving rise to a problem, and/or the indications and advice allowing users to remedy this established fact.

Figure 2B:
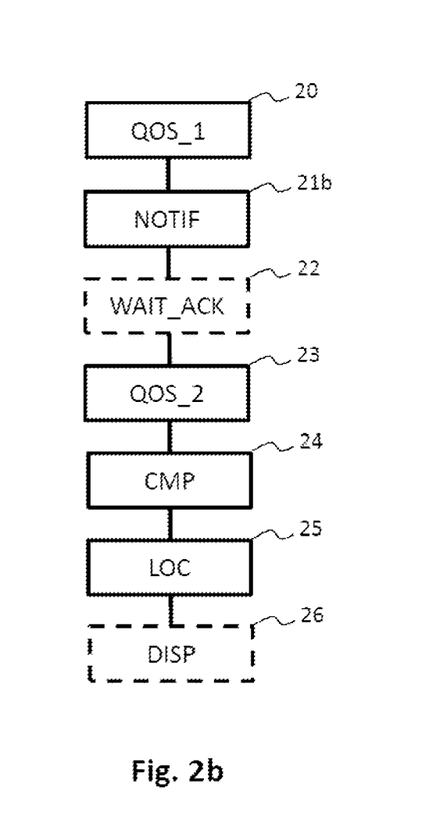
FIG. 2b illustrates the steps of the method for locating a quality of service problem implemented by a terminal in a second embodiment.

FIG. 2b illustrates another embodiment of the location method. Steps 20, 22, 23, 24, 25 and 26 are identical to those described with reference to FIG. 2a. The method furthermore comprises a step 21b during which the terminal 11, for example, can be informed that the terminal 10 has emitted a command to change the operating mode to the media gateway 12. This notification can come to it for example in the form of a media renegotiation message, such as for example in the case of an SIP communication, a message of RE-INVITE or UPDATE+PRACK type comprising an SDP (Session Description Protocol) component enriched with a new parameter. For example, the attribute a=sendrecv will take the value a=sendrecv;b2b.

Figure 3:
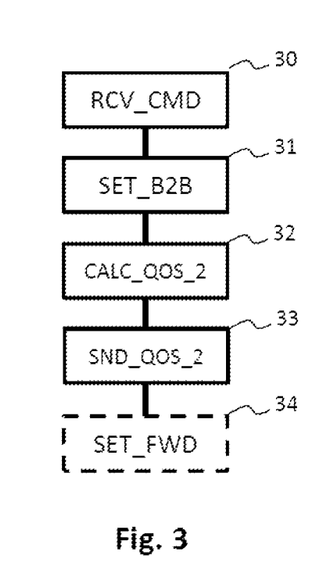
FIG. 3 illustrates the steps of the method for aiding the diagnosis of a quality of service problem implemented by a media gateway according to a particular embodiment.

FIG. 3 illustrates a particular embodiment of the diagnosis aid method implemented, for example, by the media gateway 12 in FIG. 1.

In this example, the media gateway 12 operates initially in a mode called "router mode" in which it retransmits, without particular processing, the packets of communication and quality of service data received from the terminal 10 to the terminal 11 and vice visa. This operating mode is known by the name of "forwarding" or "proxy" mode by those skilled in the art.

According to a first step 30, the media gateway obtains a command to change the mode of management of the multi-media session. According to a particular embodiment, this command can be obtained following the reception, directly or indirectly, by the media gateway 12 of the message emitted by the terminal 10 according to step 21a in FIG. 2a. The command can for example be obtained by way of a network node that is able to interpret the signaling protocol implemented to establish the multi-media session. In the case of a network of IMS type, this network node can for example be a telephony AS (Application Server) or else a P-CSCF or any other entity capable of communicating with the terminal and the media gateway.

In a step 31, the media gateway 12 activates a second mode of management called "relay mode" in which the multi-media session initially established from end to end between the two terminals 10 and 11 is split into two separate sessions, a first session established between the first terminal 10 and the media gateway 12, a second session established between the media gateway 12 and the terminal 11. In the case of a communication on the basis of the SIP protocol, this operating mode is known to those skilled in the art by the term "back to back". In this operating mode, the media gateway provides two-way relaying of the contents of the packets of media data received from one session to the other session. It then behaves as two top-to-tail terminals and possesses additional processing means to manage 2 separate RTP+RTCP sessions. The media gateway 12 then memorizes information upon the reception and emission of each packet of communication data. These items of information allow the media gateway to generate itself a second quality of service data item regularly in step 32, relating to each of the sessions and providing for example information on packet loss, delay or else jitter.

In a step 33, the media gateway then emits to the terminals 10 and 11 the quality of service data item corresponding to the session established between the terminal 10 and the media gateway and between the media gateway and the terminal 11, respectively.

In a step 34, the media gateway can return to the initial operating mode, called "router mode". This return to the "router" mode can for example be provoked by the reception of a command emitted by the terminal 11 following the location step 25 in FIG. 2a or by any other appliance that is able to detect the end of the diagnosis procedure. For example, the return to the "router" mode can also arise on the initiative of the media gateway after the passing of a predetermined time period.

Thus, if for example a quality of service problem is due to disturbances on the access network 14 of the terminal 11 (for example a problem of signal quality at a WiFi access point), the second quality of service data item received by the terminal 11 following the course of the diagnosis method will confirm that the problem can be imputed to the access network 14 or to the terminal 11. Correlatively, the second quality of service data item received by the terminal 10 will confirm that the access network 13 and the terminal 10 are not implicated. The diagnosis aid method has contributed to determining which section is responsible for the disturbances encountered.

According to another embodiment, the command to change the mode of management of the multi-media session obtained in step 30 can be obtained following the detection of a quality of service problem by a media appliance. In the case of an SIP communication, this appliance may for example be a C-BGF (Core Border Gateway Function) or any other appliance capable of inspecting the data packets exchanged by the terminals. For example, the media gateway 12 can itself detect a quality of service problem by analyzing the RTCP packets exchanged from end to end by the terminals 10 and 11. Following the detection of the problem, the media gateway can advise an appropriate network node (such as for example a telephony AS or a P-CSCF in the case of a network of IMS type) to engage a procedure of renegotiation of the multi-media session in such a way as to divide the session initially established from end to end into two separate sessions.

Once the diagnosis has been performed by the C-BGF, a notification can be transmitted to the offending terminal by the P-CSCF, for example via the notification servers of the terminal providers or by an SMS (Short Message Service) message. In the case of a SIP communication, the identifier of the terminal that may be necessary to the operation of the notifications can be transmitted in the SDP protocol, for example in the "i" (for information) field. This embodiment has the advantage of allowing the users of terminals not implementing the invention to benefit from the service of location of a quality of service problem.

Figure 4:
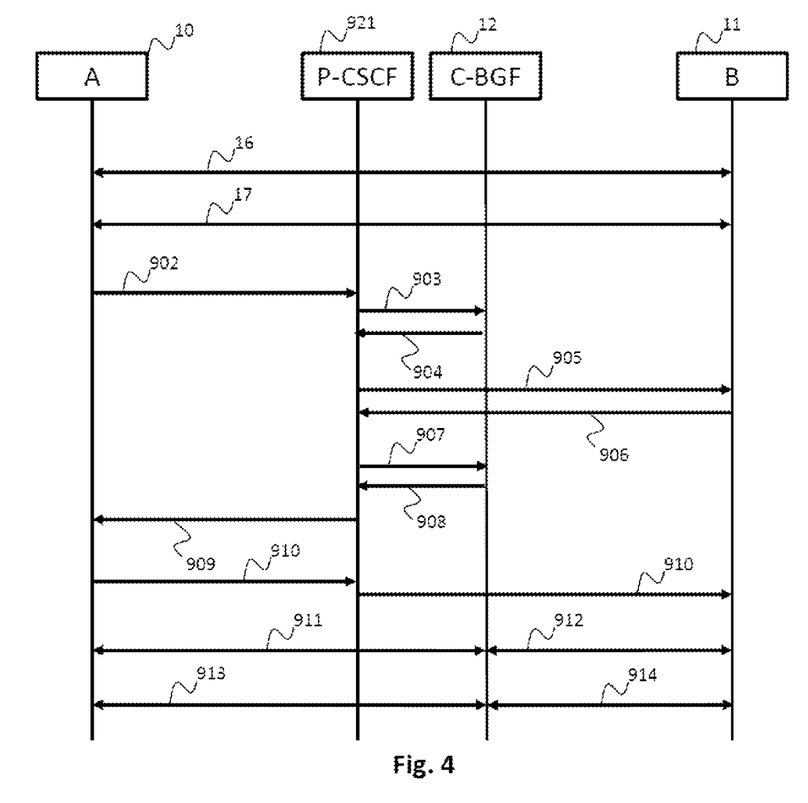
FIG. 4 shows, in the form of a timing diagram, the messages that can be exchanged between various devices implementing the invention, according to a particular embodiment.

FIG. 4 non-exhaustively illustrates messages that can be exchanged in an IMS environment to implement the location and diagnosis aid methods in a particular embodiment. The terminal A (10) and the terminal B (11) are registered for example in an IMS network core including the P-CSCF (921), but the terminals can just as well be registered on different network cores. In this example, a communication is established between the terminals A (10) and B (11) on the basis of the prior art. A multi-media session is established from end to end between the terminals and illustrated in the figure by a two-way RTP stream (16) and a two-way RTCP stream of quality of service data items (17). The streams transit in a transparent manner over the C-BGF (12), without particular processing.

Following the detection of a quality of service problem or of an action of the user, the terminal A (10) emits a command to change the operating mode of the C-BGF media gateway (12). In this example, the command is transmitted to the P-CSCF (921) in the form of an SIP request of Re-INVITE type (902) in that encapsulates an SDP description including an additional parameter, for example «b2b», in the attribute a=sendrecv. The P-CSCF (921) emits a resource reservation request (903) to the C-BGF (12), which returns (904) to it the IP address and the port number allotted to this media session. The P-CSCF then transmits (905) the Re-INVITE request whose SDP has been modified with the information returned by the C-BGF (address and port number) to the terminal B (11), so as to force the RTP and RTCP streams to transmit through the C-BGF. The additional parameter "b2b" added to the SDP by the terminal A (10) can be filtered by a network appliance before being transferred to the terminal B (11). On the basis of the embodiment, the terminal B therefore may or may not be notified of the triggering of the location method. In the case where the parameter is not filtered, it can arrive at the terminal B, which is then able to interpret the new quality of service data item, although it is not on the initiative of the diagnosis request. The terminal B (11) accepts and responds for example with an SIP 200 OK message (906) intended for the P-CSCF. The P-CSCF (921) emits a resource reservation request (907) to the C-BGF (12), which returns (908) to it the IP address and port number allotted to this media session. The latter then transfers the response to the terminal A (909) after having modified the SDP with the IP address and port number allotted by the C-BGF, so as to force the RTP and RTCP streams to transit through the C-BGF. The terminal A acknowledges the final 200 OK response by sending an ACK message (910), which is transmitted to the terminal B (11). From this moment, the C-BGF operates in a "back to back" RTP and RTCP media mode, called "relay" mode, the media streams from A (10) to B (11) being exchanged between the terminal A and the C-BGF (911), then between the C-BGF and the terminal B (912). Similarly, the quality of service streams are exchanged between the terminal A and the C-BGF (913), then between the C-BGF and the terminal B (914).

Figure 5:
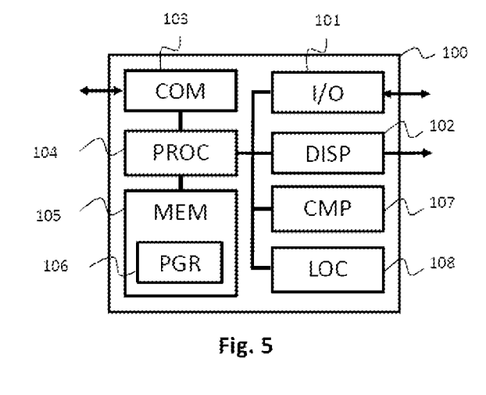
FIG. 5 illustrates the architecture of a location device according to a particular embodiment of the invention.

FIG. 5 illustrates the architecture of a device 100 implementing the method for locating a quality of service problem according to a particular embodiment of the invention.

The device comprises a storage space 105, for example a memory MEM, a processing unit 104 equipped for example with a processor PROC. The processing unit can be controlled by a program 106, for example a computer program PGR, implementing the location method as described in the invention with reference to FIGS. 2*a*, 2*b* and 4, and notably the steps of obtaining the first and second QoS data items (20, 23), of comparing the first and second QoS data items (24) and of locating the problem depending on the result of the comparison (25).

At set-up, the instructions of the computer program 106 are for example loaded into a RAM (Random Access Memory) memory before being executed by the processor of the processing unit 104. The processor of the processing unit 104 implements the steps of the method for locating a QoS problem according to the instructions of the computer program 106.

To do this, the device comprises, apart from the memory 105, communicating means 103 (COM) allowing the device to connect to the communication network and to exchange data with other devices by way of the telecommunications network, and for example to establish a telephonic or videotelephonic communication. These communicating means may for example be a network interface and are notably used to obtain the first and second QoS data items. The device also comprises means 107 (CMP) for comparing a first and a second quality of service as well as means 108 (QOS) for locating a QoS problem based on the result of a comparison of QoS data items.

The device also comprises user interaction means 101 (I/O) such as for example a keyboard, a touch-sensitive screen or an interface displayed on the screen of the terminal. These interaction means allow a user for example to dial a number or to launch a telephony or videotelephony application. According to a particular embodiment, these means enable the user to activate the method for locating a quality of service problem. According to a particular embodiment of the invention, the device comprises display means 102 (DISP) such as for example a screen for example making it possible to display in visual form a simplified representation of the network from end to end and from the place giving rise to a problem, and/or indications and advice enabling the users to remedy this established fact. According to another particular embodiment, the device is integrated in a terminal such as a mobile phone, tablet computer, personal computer, television connected to a telecommunications network, interactive terminal or any other appliance connected to a communication network.

Figure 6:
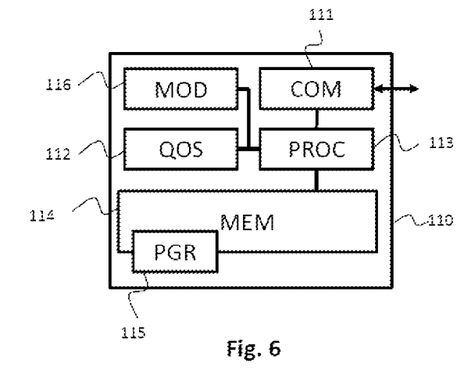
FIG. 6 illustrates the architecture of a diagnosis aid device according to a particular embodiment of the invention.

FIG. 6 illustrates the architecture of a device 110 implementing the method for aiding the diagnosis of a QoS problem, according to a particular embodiment of the invention.

The device comprises a storage space 114, for example a memory 114 (MEM), a processing unit 113 equipped for example with a processor PROC. The processing unit can be controlled by a program 115, for example a computer program PGR, implementing the diagnosis aid method as described in the invention with reference to FIGS. 3 and 4, and notably the steps of obtaining a request to change the operating mode (30, 34), of activating the "relay" operating mode (31), of computing quality of service data items (32), and of transmitting quality of service data items to the terminals (33).

At set-up, the instructions of the computer program 115 are for example loaded into a RAM memory before being executed by the processor of the processing unit 113. The processor of the processing unit 113 implements the steps of the method for locating a QoS problem according to the instructions of the computer program 115.

To do this, the device comprises, apart from the memory 114, communicating means 111 (COM) allowing the device to connect to the communication network and to exchange data with other devices by way of the telecommunications network and in particular to ensure the transit of the communication and quality of service data items according to the "router" and "relay" modes of management. In particular, these communicating means allow the sending and reception of the communication data items and the quality of service data items.

These communicating means may for example be network interfaces. According to a particular embodiment, the device comprises a module 112 (005) for analysis and generation of quality of service data items relating to the media stream transiting in the gateway. This module can for example analyze the quality of service data items exchanged between the terminals to automatically trigger a diagnosis of a QoS problem. This module can also compute the QoS data items when the gateway is in a "Relay" mode of management. The device also comprises a means making it possible to modify the operating mode 116 (MOD) from the "router" mode to the "relay" mode and vice versa.

According to another particular embodiment, the device is integrated in a network appliance as an appliance of C-BGF type, an application server (AS) that controls an MRF (Media Resource Function) or any other appliance that is able to intercept the of communication and QoS data items exchanged between terminals.

Although the present disclosure has been described with reference to one or more examples, workers skilled in the art will recognize that changes may be made in form and detail without departing from the scope of the disclosure and/or the appended claims.

The invention claimed is:
1. A method comprising:
locating by a first terminal a quality of service problem during an end to end multi-media session established through at least one media gateway between the first terminal and a second terminal over one or more communication networks, the media gateway functioning in a first mode of management of the end to end multi-media called "router mode" in which the media gateway is able to retransmit media data packets exchanged between the first and second terminals without particular processing, the first terminal obtaining a first quality of service data item relating to the end to end multi-media session established through the media gateway functioning in the first mode of management, wherein the locating comprises:
following a change activated at the media gateway of the first mode of management of the end to end multi-media session implemented by the media gateway to a second mode of management called "relay mode" in which the end to end multi-media session initially established between the first and second terminals is split into a first multimedia session established between the first terminal and the media gateway and a second multimedia session established between the media gateway and the second terminal and in which the media gateway provides two-way relaying of the media data packets exchanged between the first and the second terminals, from one of the first or second multimedia sessions to the other of the first or second multimedia sessions, performing the following steps by the first terminal:

obtaining a second quality of service data item relating to the first multi-media session established following the change in the mode of management of the media gateway to the second mode of management;

comparing the first and second quality of service data items; and locating an origin of the quality of service problem depending on the result of the comparison comprising determining whether a section situated between the first terminal and the media gateway is responsible or not responsible of disturbances at the origin of the quality of service problem.

2. The method according to claim 1, comprising a step of sending a request to change the mode of management to the media gateway preceding the step of obtaining the second quality of service data item.

3. The method according to claim 2, wherein the step of sending the request to change the mode of management is triggered following detection of a quality of service problem by comparing the first quality of service data item with a predetermined threshold.

4. The method according to claim 2, wherein the step of sending the request to change the mode of management is triggered following an action of a user on an interface of the first or second terminal.

5. The method according to claim 1, comprising a step of receiving a notification of the change in the mode of management of the media gateway.

6. The method according to claim 1, comprising a step of obtaining parameters that are able to influence the quality of service on the terminal and a step of suggesting possible actions to improve the quality of service depending on the parameters obtained.

7. The method according to claim 1, comprising, following the location step, a step of sending to the media gateway a command to change the mode of management of the multi-media session to the mode of management called "router mode".

8. The method according to claim 1, wherein locating the origin of the quality of service problem depending on the result of the comparison comprises:

if both the first and the second quality of service data items indicate disturbances, determining that the section situated between the first terminal and the media gateway is responsible for at least some of the disturbances; and if the first quality of service data item indicates disturbances and the second quality of service data item indicates a correct communication, determining that a section situated between the media gateway and the second terminal is responsible for the disturbances.

9. A method comprising:

aiding by a media gateway diagnosis of a quality of service problem during an end to end multi-media session established through the media gateway between first and second terminals, over one or more communication networks, the media gateway functioning in a first mode of management of the end to end multi-media called "router mode" in which the media gateway is able to retransmit data packets exchanged between the first and second terminals without particular processing, the method comprising the following acts performed by the media gateway:

obtaining a request to change the mode of management of the multi-media session;

activating a change in the media gateway from the first mode of management of the end to end multimedia session to a second mode of management called a "relay mode" in which the multi-media session initially established between the first and second terminals is split into two separate sessions, a first session established between the first terminal and the media gateway, and a second session established between the media gateway and the second terminal, and in which the media gateway provides two-way relaying of the media data packets exchanged between the first and the second terminals, from one of the first or second multimedia sessions to the other of the first or second multimedia sessions;

computation of a first quality of service data item relating to the first multimedia session and computation of a second quality of service data item relating to the second multimedia session in the second mode of management;

transmitting the first quality of service data item relating to the first multimedia session to the first terminal and transmitting the second quality of service data item relating to the second multimedia session to the second terminal; and changing the mode of management of the session from the "relay mode" to the "router" mode".

10. The method according to claim 9, wherein the request to change the mode of management is obtained following detection of a quality of service problem by comparing a quality of service data item relating to the session established in "router mode" with a predetermined threshold.

11. A device for locating a quality of service problem during an end to end multi-media session established through at least one media gateway between the device and a terminal over one or more communication networks, the media gateway functioning in a first mode of management of the end to end multi-media called "router mode" in which the media gateway is able to retransmit media data packets exchanged between the device and the terminal without particular processing, the device obtaining a first quality of service data item relating to the end to end multi-media session established through the gateway functioning in the first mode of management, the device comprising:

a processor; and a non-transitory computer-readable medium comprising instructions stored thereon which when executed by the processor configure the device to perform acts comprising:

following a change activated at the media gateway of the first mode of management of the end to end multimedia session implemented by the media gateway to a second mode of management called "relay mode" in which the end to end multi-media session initially established between the device and the terminal is split into a first multimedia session established between the device and the media gateway and a second multimedia session established between the media gateway and the terminal and in which the media gateway provides two-way relaying of the media data packets exchanged between the device and the terminal, from one of the first or second multimedia sessions to the other of the first or second multimedia sessions, performing the following steps by the device:

obtaining a second quality of service data item relating to the first multi-media session established following the change in the mode of management of the media gateway to the second mode of management;

comparing the first and second quality of service data items;

locating an origin of the quality of service problem depending on the result of the comparison comprising determining whether a section situated between the device and the media gateway is responsible or not responsible of disturbances at the origin of the quality of service problem.

12. A communication terminal comprising the device according to claim 11.

13. A device comprising:

a processor; and a non-transitory computer-readable medium comprising instructions stored thereon which when executed by the processor configure the device to perform acts comprising:

aiding by the device diagnosis of a quality of service problem during an end to end multi-media session established through the device between first and second terminals, over one or more communication networks, the device functioning in a first mode of management of the end to end multi-media called "router mode" in which the device is able to retransmit data packets exchanged between the first and second terminals without particular processing, the aiding comprising:

obtaining a request to change the mode of management of the multi-media session;

activating a change in the device from the first mode of management of the end to end multimedia session to a second mode of management called a "relay mode" in which the multi-media session initially established between the first and second terminals is split into two separate sessions, a first session established between the first terminal and the device, and a second session established between the device and the second terminal, and in which the device provides two-way relaying of the media data packets exchanged between the first and the second terminals, from one of the first or second multimedia sessions to the other of the first or second multimedia sessions;

computation of a first quality of service data item relating to the first multimedia session and computation of a second quality of service data item relating to the second multimedia session in the second mode of management;

transmitting the first quality of service data item relating to the first multimedia session to the first terminal and transmitting the second quality of service data item relating to the second multimedia session to the second terminal; and changing the mode of management of the session from the "relay mode" to the "router" mode".

14. The media gateway comprising the diagnosis aid device according to claim 13.

15. A non-transitory computer readable memory comprising a computer program stored thereon and including instructions for execution of a method of locating a quality of service problem when the program is executed by a processor of a first terminal, the method comprising:

locating by the first terminal the quality of service problem during an end to end multi-media session established through at least one media gateway between the first terminal and a second terminal over one or more communication networks, the media gateway functioning in a first mode of management of the end to end multi-media called "router mode" in which the media gateway is able to retransmit media data packets exchanged between the first and second terminals without particular processing, the first terminal obtaining a first quality of service data item relating to the end to end multi-media session established through the media gateway functioning in the first mode of management, wherein the locating comprises:

following a change activated at the media gateway of the first mode of management of the end to end multimedia session implemented by the media gateway to a second mode of management called "relay mode" in which the end to end multi-media session initially established between the first and second terminals is split into a first multimedia session established between the first terminal and the media gateway and a second multimedia session established between the media gateway and the second terminal and in which the media gateway provides two-way relaying of the media data packets exchanged between the first and the second terminals, from one of the first or second multimedia sessions to the other of the first or second multimedia sessions, performing the following steps by the first terminal:

obtaining a second quality of service data item relating to the first multi-media session established following the change in the mode of management of the media gateway to the second mode of management;

comparing the first and second quality of service data items; and locating an origin of the quality of service problem depending on the result of the comparison comprising determining whether a section situated between the first terminal and the media gateway is responsible or not responsible of disturbances at the origin of the quality of service problem.

* * * * *